Nov. 14, 1944.         A. J. JANSEN         2,362,902
                        LOCK JOINT
                    Filed June 21, 1943
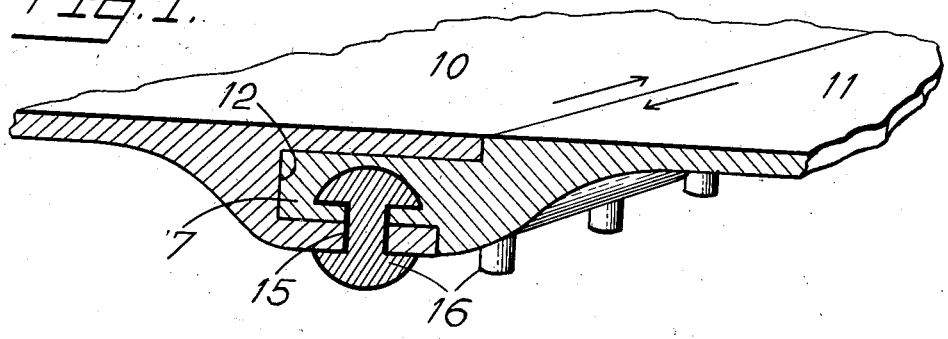
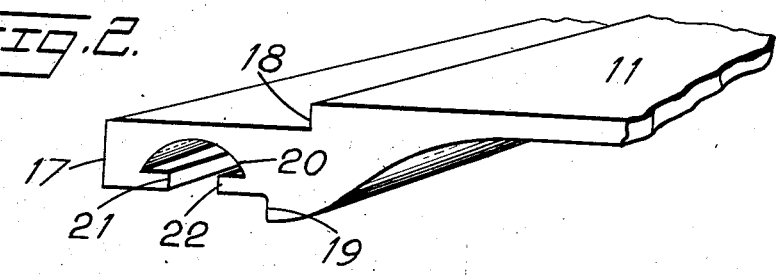
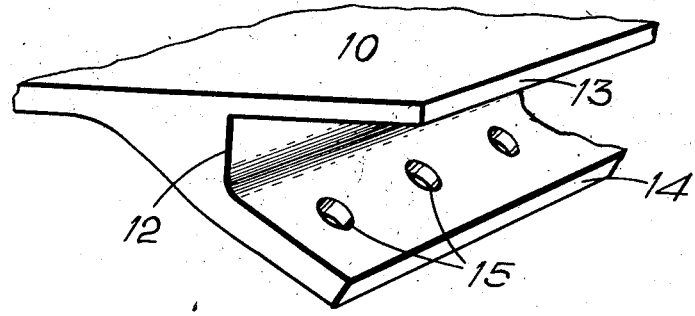
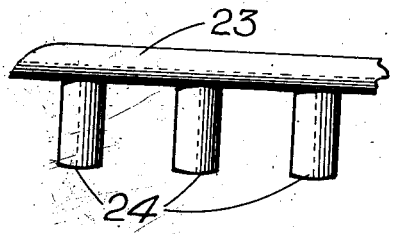
INVENTOR
Astrid J. Jansen
BY
Robert R. Caravello
ATTORNEY Patented Nov. 14, 1944

2,362,902

UNITED STATES PATENT OFFICE 2,362,902

LOCK JOINT

Astrid J. Jansen, Merrick, N. Y.

Application June 21, 1943, Serial No. 491,599

5 Claims. (Cl. 78—54)

This invention relates to a flush-seam lock joint for metal or other plates.

In the construction of airplanes, ships, prefabricated buildings, and many other structures which it is desired to assemble quickly, with precision, and with the least labor, the operation of riveting is obviously time-consuming and expensive, while projecting rivet heads interfere with streamlining.

In my improved joint, as but one member thereof is drilled for rivets and at the factory where it is produced, error in drilling is avoided, and no problem of registering rivet holes in one member with those in another exists. The rivets, moreover, may be inserted in place in one member of the joint at the factory, and as the two members forming my improved joint are adapted for longitudinal sliding engagement, assembly thereof is both rapid, precise, and easily accomplished. My improved lock-joint is highly practical in case of damage to a part of a structure in which it is used, as repairs may quickly be effected by removal of damaged sections and replacement by new sections.

With these and other advantages in view, one object of my invention is to provide a joint for metal or other plates for use in any structure where an outside flush seam with concealed rivet heads is essential, as for streamlining.

Another object is to provide a joint which will be highly resistant to corrosion when used in structures subjected to the rigors of weather or of the ocean.

A further object is to provide a joint the peculiar structure of which at least partially eliminates the need for strengthening ribs in the structure in which it is used.

With these and other objects in view, the invention consists in the novel construction and arrangement of parts hereinafter described, illustrated in the accompanying drawing, and particularly pointed out in the appended claims, it being understood that various changes in the form and constructional details may be made without departing from the spirit of the invention or sacrificing any of the advantages thereof.

In this drawing:

Fig. 1 is an enlarged fragmentary perspective view, in cross-section, of the assembled joint;

Fig. 2 is an enlarged fragmentary perspective view of one member of the joint;

Fig. 3 is an enlarged fragmentary perspective view of the other member of the joint, before the insertion of rivets therein; and Fig. 4 is an enlarged fragmentary perspective view of a modification of the means for riveting together the two members of the joint.

Referring to Figs. 1, 2, and 3 of the drawing, the joint embodied by my invention, and which may be produced preferably by an extrusion process, consists of plate sections 10 and 11. The plate 10 is formed along its edge to be joined with a thickened portion having a groove 12 formed therein, the top flange 13 of which groove is continuous with and lies in the same plane as said plate, while the bottom flange 14 thereof lies parallel with but the edge of which is slightly undercut in back of the plane of the edge of flange 13, said flange 14 being punched or drilled at regular spaced intervals with holes 15. In the process of producing plate 10, the bottom flange 14 as first formed is turned down at an angle to flange 13 sufficient to permit of the insertion downwardly therethrough in each hole 15 of a rivet 16, after which operation the flange 14 is bent, by any suitable means, upward until it attains the position parallel with flange 13, shown in Fig. 1, and the rivets are thus retained in place against dislodgement pending assembly of the joint.

The other plate 11 is formed along its edge to be joined with a thickened portion comprising a projecting tongue 17, offset a sufficient distance from the plate surface so as to lie opposite the groove 12, when the two plates 10, 11 lie in the same plane, and with shoulders 18, 19, correspondingly oppositely, with and adapted to abut the flanges 13, 14 respectively, when the joint is assembled. The tongue 17 has formed in its underside a longitudinal channel 20, arcuate in cross-section, and corresponding generally in shape to a cross-section of the head of rivet 16. Continuous with the under surface of tongue 17, projecting inwardly into and extending lengthwisely of said channel 20 on opposite sides thereof are ledges 21, 22 separated from each other by a space slightly greater than the diameter of the rivet's (16) shank.

Referring to Fig. 4, the modified riveting means there shown (and which has the identical function of rivets 16 shown in the other figures, comprises a metal strip, half-round in cross-section, which constitutes a common head 23 for rivet shanks 24, integral therewith.

In assembling the joint, the plates 10, 11 being adapted for slidable engagement with each other (as indicated by arrows in Fig. 1), tongue 17 sliding lengthwisely in groove 12), the ends of rivets 16 inserted in holes 15 are rested upon a suitable flat surface to raise and align their heads in an even row so as to be successively received by the channel 20 and their shanks to be received by the space between ledges 21, 22 as the plates 10, 11 are slid into locked engagement. To permanently lock the joint, heads are formed on the ends of rivets 16, by riveting in the usual manner (see rivet 16 shown in cross-section, Fig. 1), but as their heads are supported in channel 20, no bucking of the rivets is required.

It is obvious that bolts and nuts may be used in place of rivets, where portable, or collapsible, or alterable structures are to be constructed, in which case means, such as the modification shown in Fig. 4 at 23, may be provided so as to prevent turning of the threaded bolts as the nuts thereon are tightened down.

It is also obvious that greater strength and/or watertight character may be imparted by blowing into my improved joint under pressure material adapted to subsequent hardening, caulking material, or by sweating. It will be evident from this that a point constructed according to my invention is particularly adapted to resist corrosion, the rivets being concealed and remote from the outside seam.

Although the drawing and the above specification disclose the best mode in which I have contemplated embodying my invention, I desire to be in no way limited to the details of such disclosure, for, in the further practical application of my invention, many changes in form and in constructional details may be made as circumstances require or experience suggests without departing from the spirit of the invention within the scope of the appended claims.

I claim:

1. In a joint for metal or other plates, a plate section having a thickened edge formed with a groove therein, the top groove flange being continuous with and in the same plane as the upper surface of the plate and the bottom groove flange lying parallel to said surface and having holes formed therein at spaced intervals along its length, a second plate having a thickened edge, a tongue projecting from said edge opposite said groove when the two plates lie in the same plane, shoulders above and below said tongue corresponding to and adapted to abut said groove flanges, said tongue having a channel formed lengthwisely in its under surface, ledges continuous with the under surface of said tongue and projecting into said channel from opposite sides thereof, and fastening means in said holes and channel.

2. In a joint for metal or other plates, a plate section having a thickened edge formed with a groove therein, the bottom flange of which groove has holes formed therein at spaced intervals along its length, a second plate having a thickened edge, a tongue projecting from said edge opposite said groove, shoulders above and below said tongue adapted to abut the two flanges of said groove, said tongue having a channel formed lengthwisely in its under surface, ledges in said channel on opposite sides thereof, and rivets in said holes adapted to grip the upper surface of said ledges and the lower surface of the bottom flange of the groove.

3. In a joint for metal or other plates, a plate section having a thickened edge formed with a groove therein, the edge of the bottom flange of which groove is undercut in back of the plane of the edge of the top flange thereof, said bottom flange having holes formed therein at spaced intervals along its length, a second plate having a thickened edge and a tongue projecting therefrom opposite said groove, said tongue having a channel formed in its under surface lengthwisely thereof, ledges in said channel on opposite sides thereof, shoulders above and below said tongue adapted to abut the two flanges of said groove, and rivets in said holes and channel.

4. In a joint for metal or other plates, a plate section having a thickened edge formed with a groove therein, the bottom flange of which has holes formed therein, a second plate having a thickened edge and a tongue projecting therefrom opposite said groove, said tongue having a channel arcuate in cross-section formed in its under surface lengthwisely thereof, ledges in said channel on opposite sides thereof, shoulders formed above and below said tongue adapted to abut the two flanges of said groove, and rivets in said holes and channel.

5. In a lock-joint for metal or other plates, a plate section having a thickened edge and a groove formed therein, the top flange of which is continuous with and lies in the same plane as the upper surface of the plate and the bottom flange of which groove has holes formed therein at spaced intervals along its length, a second plate with a thickened edge and a tongue projecting therefrom opposite said groove, said tongue having shoulders above and below it abutting the two flanges of said groove and a channel formed in its under surface lengthwisely thereof, with ledges projecting into said channel formed on opposite sides thereof, and a series of rivets having a common head in the form of a strip in said channel and the shanks of which extend through said holes.

ASTRID J. JANSEN.